(12) United States Patent
Heisey

(10) Patent No.: US 7,393,387 B1
(45) Date of Patent: Jul. 1, 2008

(54) PARTICLE FILTER CLEANING APPARATUS

(76) Inventor: Andreas Heisey, 615 Florence St., Columbia, PA (US) 17512

( * ) Notice: Subject to any disclaimer, the term of this patent is extended or adjusted under 35 U.S.C. 154(b) by 254 days.

(21) Appl. No.: 11/447,440

(22) Filed: Jun. 6, 2006

Related U.S. Application Data

(60) Provisional application No. 60/692,330, filed on Jun. 20, 2005.

(51) Int. Cl.
*B01D 41/00* (2006.01)
(52) U.S. Cl. .............. 95/279; 95/280; 55/294; 55/302; 55/303; 134/153
(58) Field of Classification Search .......... 55/283, 55/284, 290, 294, 301, 302, 303, 304, 305; 95/278, 279, 280; 96/425, 428; 134/153, 134/157
See application file for complete search history.

(56) References Cited

U.S. PATENT DOCUMENTS

| | | | |
|---|---|---|---|
| 5,135,580 A * | 8/1992 | Cantrell et al. ........... 134/22.11 |
| 5,741,351 A | 4/1998 | Beal et al. | |
| 6,428,588 B1 | 8/2002 | Holyoak et al. | |
| 6,745,430 B2 | 6/2004 | Holman et al. | |
| 7,025,811 B2 * | 4/2006 | Streichsbier et al. .......... 95/279 |
| 2004/0079401 A1 | 4/2004 | Smith | |

* cited by examiner

*Primary Examiner*—Duane Smith
*Assistant Examiner*—Robert A Clemente
(74) *Attorney, Agent, or Firm*—Martin Fruitman

(57) ABSTRACT

The invention is an apparatus for cleaning one or more cylindrical filters. An enclosure contains the entire apparatus in which each filter is supported on its own pair of rotating horizontal rollers. An assembly of air nozzles adjacent to a first end of each rotating filter is moved radially across the filter end to blow the particles out of the filter and into a particle collector at the second end. A second assembly of air nozzles at the second end then operates in a similar manner. The positions of the air nozzles are manually adjusted for filters of differing length. A simpler unit has only one assembly of air nozzles, but requires manually reversing the position of the filter for the second operation.

8 Claims, 3 Drawing Sheets

PARTICLE FILTER CLEANING APPARATUS

This application claims the benefit of provisional patent application 60/692,330 filed Jun. 20, 2005.

BACKGROUND OF THE INVENTION

This invention deals generally with an apparatus for cleaning filters and more specifically with an apparatus that blows pressurized air axially through cylindrical filters as the filters are being rotated.

For those of us familiar with only disposable household furnace filters and automobile air filters, the concept of cleaning filters seems ridiculous. However, there are valid reasons for cleaning filters. One reason that is mentioned in U.S. Pat. No. 6,428,588 by Holyoak et al. is to remove contaminants to facilitate the disposal of the filters. Another reason is the exceptionally high cost of some filters.

New government regulations require diesel engines to dramatically clean their exhaust discharge to prevent air contamination because bus and truck diesel engines are a major source of gaseous, particulate hydrocarbons, and carbon pollutants in urban areas. In order to meet the government regulations ceramic diesel particulate filters are installed in such vehicles in the exhaust stream immediately following the catalytic converter. However, such diesel particulate filters are very costly, and replacing them with new ones when they are too dirty is uneconomical.

It would be very beneficial to have available a cleaning system for diesel particulate filters that could automatically clean the filters and do so at a low cost.

SUMMARY OF THE INVENTION

The preferred embodiment of the present invention automatically cleans several diesel particulate filters simultaneously. It is helpful to understand the geometry of such filters. The filters consist of ceramic filter material enclosed within open ended cylindrical covers, and when in use the gas flow through the filters is axial and end to end. The particles in the gas are then trapped within the ceramic material.

In the present invention an enclosure contains the entire apparatus in which each of several filters is supported on its own pair of rotating horizontal rollers. One or more air nozzles forming a first assembly of air nozzles is located adjacent to a first end of each rotating filter and is moved radially across the filter end structure, and the nozzles direct pressurized air against the end structure of each filter to blow the particles out of the second end of each rotating filter. The particles are collected by exhaust collectors, with an individual exhaust collector located at the second end of each of the filters.

After a period of time, the collectors at the second ends of the filters are moved away and a second assembly of air nozzles at the second end of each rotating filter begins a radial movement similar to that which the first nozzles completed. During this action, particles that were not blown out of the filters by the first nozzles are dislodged but stay within the filters. To remove the dislodged particles and for dirtier filters, the apparatus can be programmed for subsequent additional cleaning periods that continue to alternately activate the air nozzles at the first and second ends of the filters.

A more basic, manual embodiment of the invention has only one air nozzle assembly, but requires manually reversing the position of the filter for the second operation. In both the manual and automatic embodiments, the position of the air nozzles can be manually adjusted for filters of differing length.

DETAILED DESCRIPTION OF THE INVENTION

Figure 1:
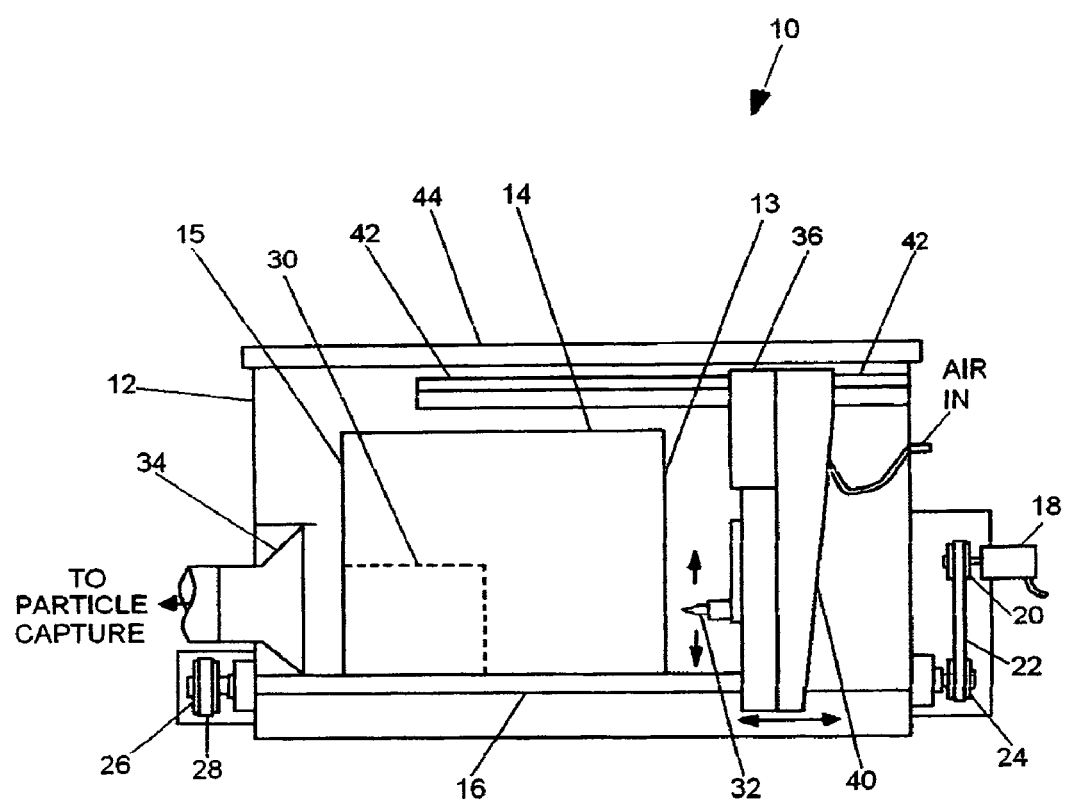
FIG. 1 is a schematic side view of the basic filter cleaner of the manual embodiment of the invention with the near side of the enclosure removed for viewing the internal components.

FIG. 1 is a schematic side view of filter cleaner 10 which is the basic, manual embodiment of the invention. The near side of enclosure 12 is removed for viewing the internal components.

Figure 3:
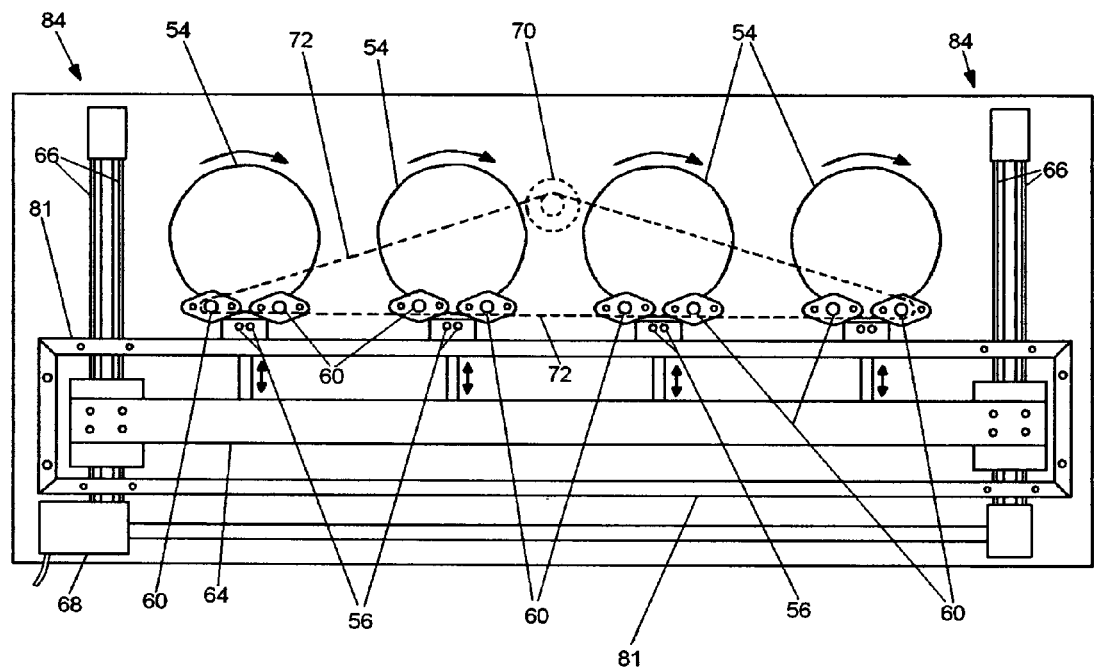
FIG. 3 is a schematic end view of the automatic filter cleaner of the preferred embodiment of the invention with the near side of the enclosure removed for viewing the internal components.

For the cleaning operation, filter 14 which consists of ceramic filter material enclosed within a cylinder, sits on a pair of rotating rollers. Only one roller 16 can be seen in FIG. 1, because the two rollers are in a horizontal plane. Roller 16 is rotated by motor 18 through pulley 20, belt 22, and pulley 24. The second roller is powered from roller 16 through pulley 26 and belt 28. Filter 14 thus sits atop the two rollers, as is shown in FIG. 3, and is rotated at the speed determined by motor 18 and the several pulleys. Filter cleaner 10 can also accommodate filters of different sizes as is indicated by filter 30 shown with dashed lines.

The cleaning of the filters is accomplished by blowing pressurized air from nozzle 32 into end structure 13 of filter 14 and through filter 14 to dislodge the trapped particles. Collector 34, which is connected to a particle capture system (not shown), pulls the air and the particles discharged from end structure 15 of filter 14 out of enclosure 12. In order to clean the entire volume of filter 14, nozzle 32 is moved radially across filter end structure 13 as filter 14 rotates. The radial movement of nozzle 32 is accomplished by moving it vertically up and down with linear actuator 36. Linear actuator 36 can be any conventional actuator such as a reversible motor driving a screw thread, a belt drive, or a hydraulic piston.

The cleaning procedure usually includes at least a second pass of nozzle 32 across filter 14 with air flow in the reverse direction to dislodge any remaining particles. For the embodiment of FIG. 1 this reversal of air flow is performed manually by lifting off enclosure cover 44 and reversing filter 14 so that end structure 15 is adjacent to nozzle 32, and then repeating the previous cleaning operation. Additional reversals and cleaning operations can be performed on the filter when required for complete removal of particles within the filter. Cover 44 is, of course, also opened to load and unload filters that are being cleaned.

Nozzle 32 and linear actuator 36 are mounted on movable support 40, which is installed on slide rails 42 so that support 40 can be moved closer to or farther from end structure 13 of filter 14 to accommodate longer or shorter filter lengths. This movement is on a line parallel to the axis of filter 14. Such an adjustment is done manually with cover 44 removed from enclosure 12, and can be done at the same time as a filter is installed for cleaning.

Figure 2:
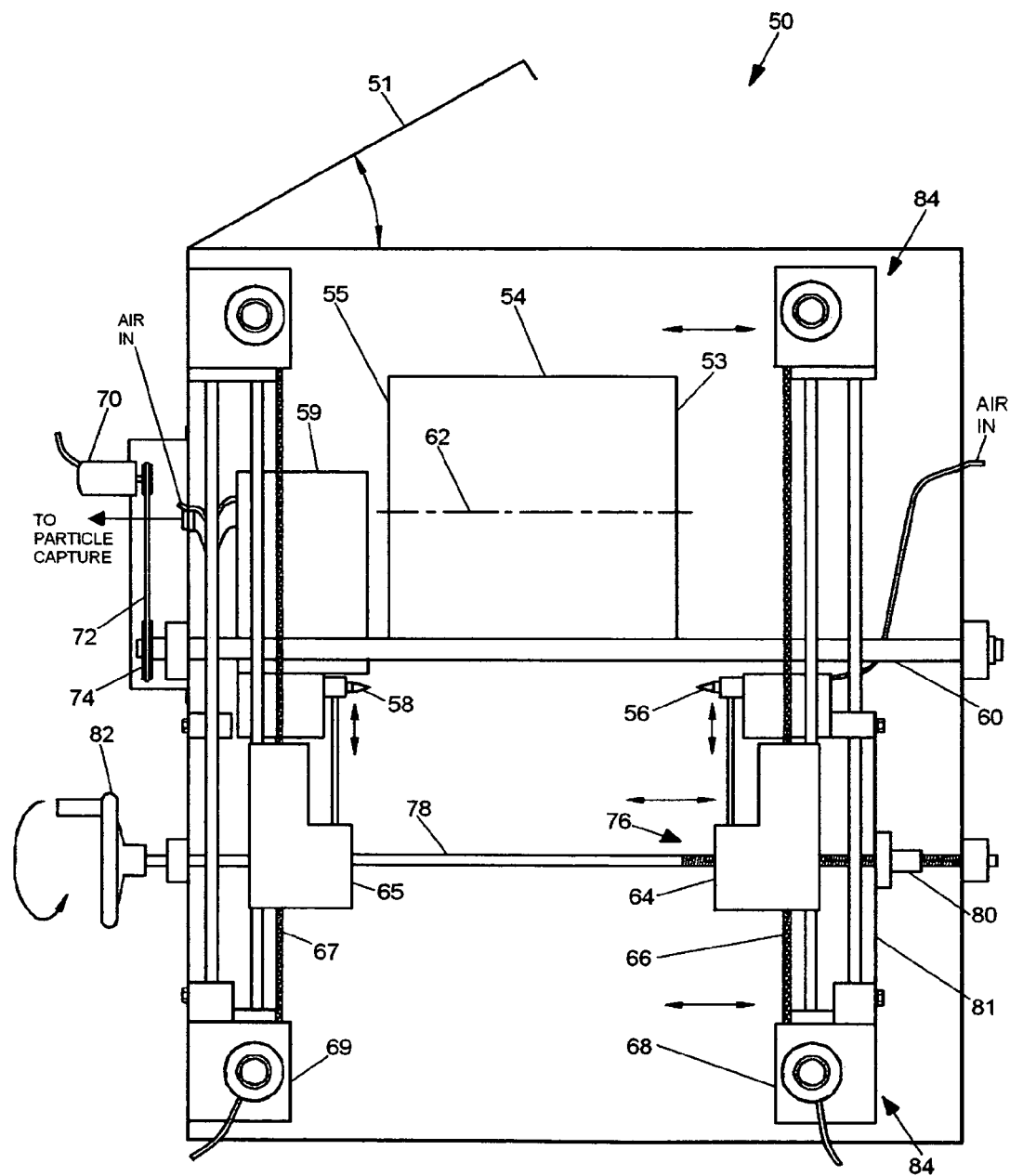
FIG. 2 is a schematic side view of the automatic filter cleaner of the preferred embodiment of the invention with the near side of the enclosure removed for viewing the internal components.

FIG. 2 is a schematic side view of automatic filter cleaner 50 of the preferred embodiment of the invention with the near side of enclosure 52 removed for viewing the internal components, and FIG. 3 is a schematic end view of automatic filter cleaner 50 of the preferred embodiment of the invention also with the near side of the enclosure removed for viewing the internal components. Hinged cover 51 is closed during the cleaning operation, but can be opened to load and unload filters that are being processed.

The filter cleaning process in automatic filter cleaner 50 of FIGS. 2 and 3 is essentially the same as the process described for FIG. 1. The difference is that filter cleaner 50 shown in FIG. 2 and FIG. 3 simultaneously cleans multiple filters (as seen in FIG. 3) and automatically performs the reverse cleaning action that is done in filter cleaner 10 of FIG. 1 by manually repositioning the filter.

However, the filters themselves are not reversed in filter cleaner 50. Instead of reversing the filters, each filter 54 has one assembly of nozzles 56 at a first end and another assembly of nozzles 58 at the second end of the filter. Moreover, exhaust collectors 59 are located near and attached to nozzles 58, so that exhaust collectors are available at one end of each filter. Exhaust collectors 59 are interconnected with a particle capture apparatus (not shown) that is a conventional filtered industrial exhaust system.

For the first period of the cleaning of each filter 54, while filter 54 is being rotated by its rollers 60, nozzles 56 are moved vertically upward across filter end structure 53 at least as far as filter centerline 62. This movement of nozzles 56 across the radii of the filters is accomplished by moving support 64, to which all the nozzles 56 are attached. Support 64 is itself moved by motor 68 by the use of chains 66.

During the second period of the cleaning of the filters, nozzles 58 are moved vertically upward across filter end structure 55 at least as far as filter centerline 62. This movement of nozzles 58 across the radii of the filters is accomplished by moving support 65, to which all the nozzles 58 and all the exhaust collectors 59 are attached. Support 65 is itself moved by motor 69 by the use of chains 67.

Since exhaust collectors 59 are attached above nozzles 58, they move up and down along with their associated nozzles. This movement of exhaust collectors 59 places them in line with the air flow when nozzles 56 are blowing pressurized air at end structure 53 at the first end of filter 54. The reversed air flow in filter 54 is accomplished by alternating the actions of nozzles 56 and 58. Thus, while nozzles 56 are blowing pressurized air through filter 54, nozzles 58 are lowered into the position shown in FIG. 2, and that positions exhaust collector 59 to collect the particles blown out of filter 54 by nozzles 56.

When the programmed electrical control system (not shown) for filter cleaner 50 reaches a selected time for reversing the air flow, nozzles 56 can be lowered out of the way. Nozzles 58 are then moved across end structure 55 blowing pressurized air to dislodge trapped particles in filter 54. Since most filters are designed to prevent particles from exiting in one direction (for example toward nozzles 56) no exhaust collector is needed adjacent to nozzles 56. However, additional exhaust collectors could be installed above nozzles 56 in the same manner as exhaust collector 59 is mounted above nozzles 58 in order to clean filters that permit through flow in both directions. The control system can also be set to repeat the cleaning period that used nozzles 56 so that the particles dislodged by nozzles 58 can be removed from the filter. The cleaning periods described above can also be repeated as many times as is deemed necessary for the contamination conditions of the filters being cleaned.

FIGS. 2 and 3 also show the apparatus for rotating rollers 60, which is similar to that shown in FIG. 1. The power to rotate rollers 60 is furnished by motor 70 and is transmitted to rollers 60 by belt 72 acting on pulley 74.

Filter length adjustment apparatus 76 is also shown in FIG. 2. It is based upon threaded rod 78 that mates with threaded bushing 80 attached to frame 81. As manual control wheel 82 and threaded rod 78 are rotated, the interaction between threaded rod 78 and threaded bushing 80 moves frame 81 and entire assembly 84, which includes moving support 64, motor 68, and all of the nozzles 56, closer to or farther away from filter 54. This action allows filter cleaner 50 to accommodate filters of different lengths. Smaller diameter filters can be handled without any adjustment because, with nozzles 56 moving vertically only one half the diameter of larger filters such as filter 54, nozzles 56 merely move across a greater portion of the diameter of smaller filters. However, with only minor reprogramming of the electrical control system (not shown), the length of the travel path of nozzles 56 can also be reduced.

The preferred embodiment of the invention thereby furnishes an automatic programmable filter cleaner for one or more cylindrical filters, and can dramatically reduce the cost of using such filters.

It is to be understood that the form of this invention as shown is merely a preferred embodiment. Various changes may be made in the function and arrangement of parts; equivalent means may be substituted for those illustrated and described; and certain features may be used independently from others without departing from the spirit and scope of the invention as defined in the following claims. For example, the invention can be constructed to simultaneously clean fewer or more than the four filters shown in FIG. 3, and any number of air nozzles, including a single one, can be used on each filter instead of the two shown in FIG. 3.

What is claimed as new and for which Letters Patent of the United States are desired to be secured is:

1. A method of cleaning cylindrical filters that have first and second end structures, comprising:
   loading a filter onto two rotating rollers within an enclosure;
   locating a first assembly of at least one air nozzle adjacent to the first end structure of the filter;
   directing pressurized air against the first end structure of the filter with the first assembly of at least one air nozzle;
   collecting particles blown from within the filter with an exhaust gas and particle collector located at the second end structure of the filter; and
   moving each first assembly of air nozzles along a radius of the first end structure of the filter.

2. The method of claim 1 for cleaning cylindrical filters that have first and second end structures, further comprising:
   locating a second assembly of at least one air nozzle adjacent to the second end structure of the filter;
   directing pressurized air against the second end structure of the filter with the second assembly of at least one air nozzle; and
   moving each second assembly of air nozzles along a radius of the second end structure of the filter.

3. An apparatus for cleaning cylindrical filters that have first and second end structures, comprising:
   an enclosure with a moveable cover to permit loading and unloading of filters being cleaned;
   two rotating rollers to support and rotate each filter;
   a motor interconnected with and powering the rotation of the rollers;

a first assembly of at least one air nozzle locatable adjacent to the first end structure of a filter supported by the rollers, with the first assembly of at least one air nozzle directing pressurized air against the first end structure of the filter;

an exhaust gas and particle collector located at the second end structure of a filter supported by the rollers; and an apparatus to move the first assembly of at least one air nozzle along a radius of the first end structure as the filter is rotating.

4. The apparatus of claim 3 for cleaning cylindrical filters further including an apparatus for moving the first assembly of at least one air nozzle on a line parallel to the axis of the filter to adjust for filters of differing lengths.

5. The apparatus of claim 3 for cleaning cylindrical filters further including a track for moving the first assembly of at least one air nozzle on a line parallel to the axis of the filter to adjust for filters of differing lengths.

6. The apparatus of claim 3 for cleaning cylindrical filters further including a threaded rod with an attached control wheel and a mating threaded bushing for moving the first assembly of at least one air nozzle on a line parallel to the axis of the filter to adjust for filters of differing lengths.

7. The apparatus of claim 3 for cleaning cylindrical filters further including:

a second assembly of at least one air nozzle located adjacent to the second end structure of a filter supported by the rollers, with the second assembly of at least one air nozzle directing pressurized air against the second end structure of the filter.

8. The apparatus of claim 3 for cleaning cylindrical filters further including:

a second assembly of at least one air nozzle located adjacent to the second end structure of a filter supported by the rollers, with the second assembly of at least one air nozzle directing pressurized air against the second end structure of the filter; and with the exhaust gas and particle collector attached to and moving with the second assembly of at least one air nozzle.

* * * * *